Aug. 13, 1957 — I. KALIKOW — 2,802,555
MEANS FOR DISCONNECTING SHAFT
Filed Nov. 1, 1955
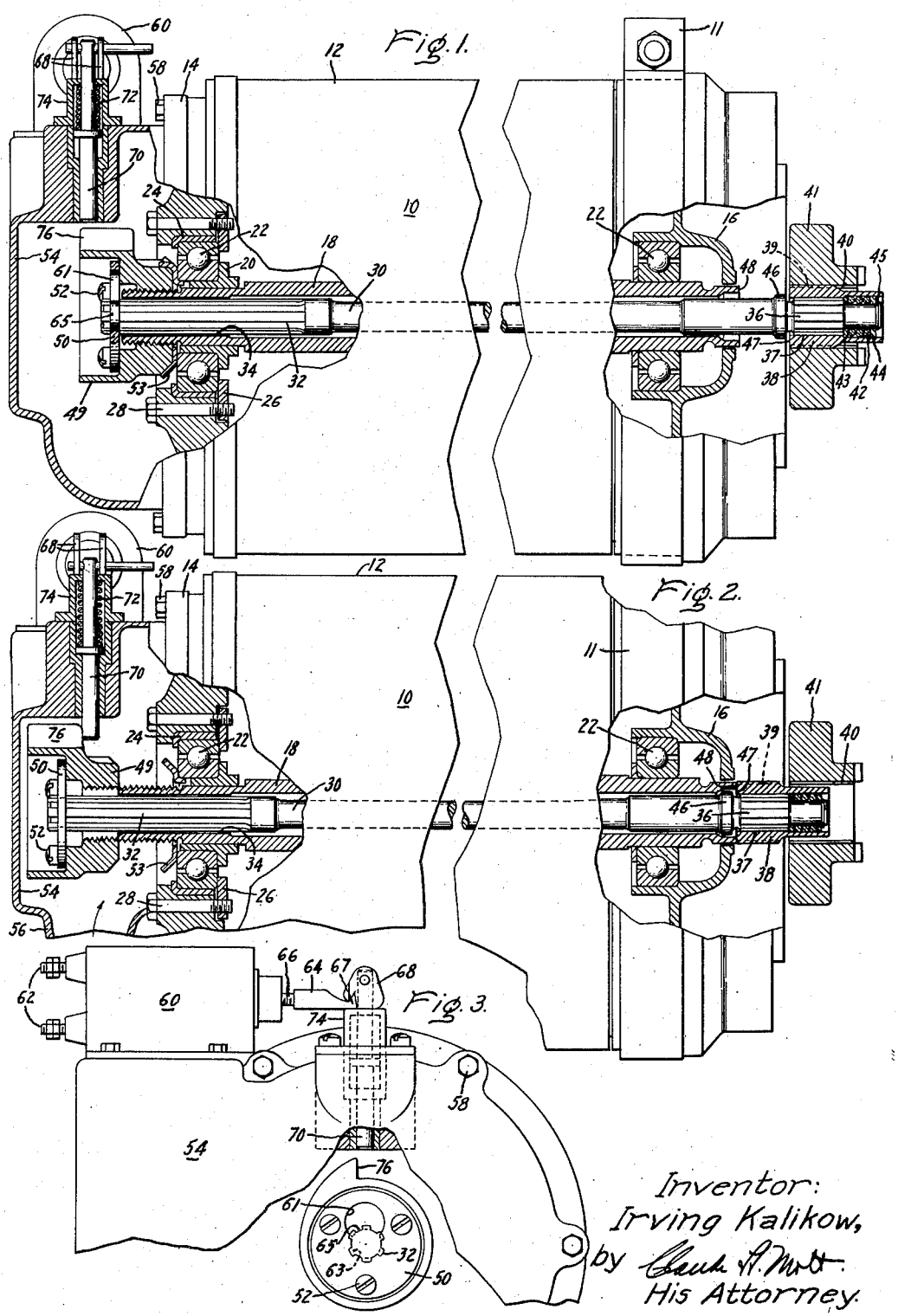
Inventor:
Irving Kalikow,
by Claude A. Mott
His Attorney.

United States Patent Office 2,802,555
Patented Aug. 13, 1957

---

2,802,555

MEANS FOR DISCONNECTING SHAFT

Irving Kalikow, Swampscott, Mass., assignor to General Electric Company, a corporation of New York Application November 1, 1955, Serial No. 544,213

6 Claims. (Cl. 192—24)

This invention relates to disconnecting devices and more particularly to an arrangement for disconnecting the driven shaft of an auxiliary unit from an engine and has for its object the provision of an improved device characterized by its simplicity of operation of parts and the certainty with which it is made operative to disconnect an auxiliary unit from a driving member in the event of an emergency.

The hazard to which an aircraft is subjected upon electrical or mechanical failure of auxiliary units driven from an engine is immeasurable, particularly if the auxiliary unit is positioned on the engine in a manner in which damage to adjacent auxiliary units or to the engine may result. It has been found, for example, that upon mechanical failure of a generator, the rotor, revolving at speeds of 8,000 to 12,000 R. P. M., physically engages the stator causing generation of heat so intense that varnish and other insulating materials readily ignite, and magnesium and copper in the generator also melt and flow with subsequent ignition of oil and gas vapors. Furthermore, the auxiliary units, such as a generator, are directly coupled to the engine and facilities are not made available for disconnecting them in an event of a casualty to the operating parts. Such facilities are not more generally utilized because the cost and excessive weight in parts necessary to achieve this security of operation are prohibitive.

Accordingly, the problem of providing disconnecting means for the auxiliary units, within reasonable limits of cost and weight, has been given considerable thought and attention. It is recognized that the optimum design of such units would include the provision of disconnecting features having parts which are common to other structure in the units serving an entirely different function. This character of design would not only effect a saving in cost and weight, but also would provide a compact unit containing desirable safety features.

In carrying out my invention, I provide such an optimum design while simultaneously eliminating the hazards and disadvantages cited above. I specifically apply my invention to a dynamoelectric machine, although it will be apparent that it is equally applicable to other types of auxiliary units. Briefly stated, I provide a disconnecting device incorporated in the confines of a generator which is capable of disconnecting the generator from an engine by merely energizing an electrical solenoid from a remote point. A flexible torque rod is concentrically positioned within a hollow armature or quill shaft, and one end of each of the shaft and rod are splined together to permit axial or longitudinal displacement of the rod in the shaft. The other end of the rod is removably connected to the engine, so that in normal operation power is transmitted from the engine through the torque rod, to the quill shaft and rotor with which it is directly connected. In order to obtain disengagement of the rod from the engine to effect isolation of the generator, a disconnecting nut is threaded on an end of the quill shaft and is normally held thereon by a plate which is attached to an end of the torque rod. The disconnecting nut has a lug engageable by a solenoid plunger and the parts are arranged in a manner whereby engagement of the lug by the solenoid plunger blocks rotation of the nut with the quill shaft. As a result, it is backed off from the quill shaft, and carries the torque rod with it, thereby effecting axial withdrawal of the rod from the engine to obtain isolation of the generator.

For a more complete understanding of the invention, which will be particularly pointed out in the appended claims, reference is now made to the following description taken in connection with the accompanying drawings in which:

Figure 1 is a view in elevation, partly in section, showing component parts of the disconnecting device when the generator is in an operative condition;

Figure 2 is a view in elevation, partly in section, showing the arrangement of parts when the torque rod has been withdrawn from engagement with the engine and the generator is in an inoperative condition;

Figure 3 is an end view of the device shown in Figure 1 illustrating a solenoid and associated parts effective to cause disconnection of the generator from the engine.

Referring now to the drawing wherein like reference characters designate like or corresponding parts throughout the several views, there is shown a dynamoelectric machine, such as a generator 10 having a housing 12 and end shields 14 and 16, each being provided with central openings for receiving a quill shaft 18 adapted for rotation therein. The quill shaft supports a rotor, not shown, and is provided with a spacer member 20 for centering the shaft and holding anti-friction bearings 22 in end shield 14 fixed to the end of the housing. A second cylindrical spacer ring 24 coacts with the end shield and an outer race of bearing 22 for firmly anchoring the bearing to housing 12. Retaining ring 26, held in place by bolts 28, prevents lateral movement of bearing 22 inwardly of the housing.

As shown in these figures, a flexible torque rod 30 positioned concentrically within quill shaft 18, is provided with splines 32 engaging splined grooves 34 formed on the inner peripheral surface of hollow quill shaft 18. The other end of the torque rod is equipped with a shorter, but similar, set of splines 36 meshing with splined grooves 37 shaped in a coupler 38. The coupler 38 is likewise connected through a spline-groove arrangement 39 and 40 to an engine drive member 41 constructed and arranged for transmitting power from an engine through coupler 38 to the torque rod for driving the generator. In order to restrain the coupler 38 axially on the torque rod 30, a spring 42 is positioned between a pair of bearing rings 43 and 44 provided on an extension of the torque rod and the spring is maintained in a compressed condition by a snap ring 45 fitted in locking engagement with the rod extension. This construction firmly fixes the coupler 38 to the rod so that they will move in unison when the rod is actuated to a disengaged position. The splines 36 and 37 however are rotatably loose with sufficient angular clearance to limit and absorb torsional vibration at or near the critical frequency.

This principle of controlling torsional vibrations to a rotating body is well known and is shown and described in Patent Number 2,658,361, issued to the present inventor and assigned to the same assignee as this invention. The generator 10 is provided with an attachment 11 arranged for supporting the generator on an engine accessory supporting member in the manner shown and disclosed in Patent Number 2,645,438, also issued to the instant inventor and assigned to the same assignee as this invention.

The torque rod 30 is arranged to be disconnected from the engine drive member 41 by axially retracting splines 39 from splined grooves 40 in a manner hereinafter more fully described. However, in order to limit the lateral movement of the torque rod 30 in coupler 38 in a direction to the right, as shown in Figure 1, the rod is provided with a collar 46 of greater diameter than the inner diameter of coupler 38 so that the front surface 47 of the coupler serves as a stop when the rod is pushed into a spline engaging position. Likewise, the end 48 of hollow quill shaft 18 is shaped to a configuration compatible with the external surface of collar 46 so that upon movement of the rod 30 to the left, as shown in Figure 2, the collar fits within the quill shaft and surface 47 abuts the end 48, thereby coacting to form a second stop member effective in limiting movement of the rod and attached coupler 38 to the left.

In order to obtain disengagement of the torque rod from engine driving member 41 for isolating the generator from the engine, a disconnecting nut 49 is threaded on an extension of quill shaft 18 and is provided with a hollowed out portion for receiving a plate 50 attached to the nut by bolts 52. The nut is prevented from accidental turning relative to the shaft by a plurality of tabs 53 formed on a ring member encircling the shaft and arranged to be bent into locking engagement with flat surfaces on the nut.

As shown in Figure 3, the plate is provided with an off-center opening 61 of keyhole configuration having its lower portion 63 arranged to coincide with the center line of the torque rod 30. The splines 32 on the torque rod are broken to expose the shaft 65, the broken splines providing a groove around its periphery equal in depth to the height of splines 32 formed on the rod. In assembling these parts, the plate is mounted on the rod, before the rod is pressed into engagement with the engine drive member 41, by sliding the large part of the keyhole opening in the plate on to the end of the torque rod. When the plate is aligned with the groove in the torque rod, it is moved into the groove thereby resulting in alignment of the center lines of the plate and rod. The rod is then pressed inwardly and bolts 52 inserted for rigidly securing the plate to the disconnecting nut 49. It will be evident from this construction that the quill shaft 18, torque rod 30, disconnecting nut 49 and plate 50 all rotate as a single unit when power is being transmitted to the generator. In the event the nut 49 is prevented from rotating, the torque rod will continue to rotate because the plate is fitted within the groove provided in the end of the torque rod. When the nut is backed off the quill shaft, the plate will obviously carry the torque rod with it.

Affixed to the outboard end of generator 10 is an air blast cap 54 having an air inlet 56 and being arranged for positioning on the end of the housing by a plurality of bolts 58. The openings in the cap for receiving such bolts are symmetrical around the periphery and also symmetrical with respect to the outboard side of the generator housing so that the air cap may be rotated to any one of a plurality of positions in locating the inlet 56 at a position accessible to air which flows therethrough for cooling the generator. The position of the air blast cap on the outboard side of the generator also provides for ease of removal in facilitating inspection of the drive members for the generator.

Mounted on a side of the air blast cap is a solenoid control device 60 having terminals 62 adapted for connection to a source of electrical supply. A member 64 is screw-threaded at one end on an armature shaft 66 of the solenoid and is provided with a projecting lug 67 at its other end utilized in actuating an over-center cam 68. The cam is fixed to a plunger 70 biased inwardly and downwardly by spring 72 mounted in housing 74 so that when the solenoid is energized to release the cam, the spring forces the plunger 70 into contact with the engaging tab 76.

*Operation*

In operation, power is normally transmitted from the engine through torque rod 30 to quill shaft 18 for causing operation of the generator. At this time the solenoid is not energized and the plunger is held up by the cam. In the event of a casualty to the generator, a pilot in the cockpit closes a switch for energizing solenoid 60. Actuation of the solenoid draws member 64 to the left, pulling cam 68 out of position thereby permitting spring 72 to force the plunger downwardly into engagement with lug 76 positioned on the end of disconnecting nut 49. This causes the disconnecting nut 49 to stop rotating while the quill shaft 18 continues to rotate, with the consequent result that the disconnecting nut is threaded off the quill shaft from the position shown in Figure 1 to that shown in Figure 2. It is to be noted that the torque rod 30 will also continue to rotate since the lower portion of the keyhole slot loosely fits in the groove provided in the end of the torque rod. As the nut 49 is being threaded off the quill shaft, it will carry torque rod 30 with it, thereby withdrawing splines 39 out of engagement with spline grooves 40 positioned in the engine drive member 41. Since there no longer is a direct connection between the torque rod 30 and the engine, motion formerly provided to the rod is now terminated, thereby completely isolating the generator from the engine. When it is desired to determine whether the torque rod has been withdrawn from the engine, an operator need only remove bolts 58 from an end of the generator housing and remove the air blast cap 54 which will then expose the operatng parts. To make the device operative, an operator need only press the torque rod inwardly until splines 39 on coupling 38 engage spline grooves 40 provided on the engine drive member 41. The air blast cap is then merely replaced by the reinsertion of bolts 58 in the generator housing.

Obviously, many modifications and variations of the present invention are possible in light of the above teachings. It is therefore to be understood that within the scope of the appended claims, the invention may be practiced otherwise than as specifically described.

What I claim as new and desire to secure by Letters Patent of the United States is:

1. A disconnect device for disconnecting an engine from a driven auxiliary unit comprising a flexible torque rod adapted for engagement at one end with said engine and connected at its other end to a shaft for driving said auxiliary unit, said torque rod being slideable axially of said shaft a distance sufficient to effect disengagement thereof with said engine, means movably mounted on said shaft and connected with said torque rod for rotation in unison therewith, and blocking means positioned adjacent said movably mounted means for selective engagement therewith so that upon actuation of said blocking means, said movably mounted means is prevented from rotation and caused to move axially through said distance thereby withdrawing said torque rod from engagement with said engine.

2. A disconnect device for disconnecting an engine from a driven auxiliary unit comprising a flexible torque rod adapted for engagement at one end with said engine and connected at its other end to a shaft for driving said auxiliary unit, a disconnecting member removably mounted on said shaft and arranged for coaction with said torque rod to effect disengagement of said rod from said engine when said disconnecting member is blocked from rotation with said shaft, air directing means having an air inlet attached to the outboard end of said auxiliary unit for providing cooling air thereto, and blocking means on said air directing means arranged for selective engagement with said disconnecting member for preventing rotation of the latter with said shaft.

3. The combination according to claim 2 wherein said air directing means comprises an air blast cap having connecting means for selectively attaching said cap on the outboard end of said auxiliary unit in any one of a plurality of positions.

4. A disconnect device for disconnecting an engine from a driven auxiliary unit comprising a quill shaft arranged for driving said auxiliary unit, a torque rod positioned concentrically within said quill shaft and being connected at one end to said quill shaft and adapted for connection at its other end to said engine, the connections of said rod with said shaft and engine being arranged in a manner whereby said rod is capable of longitudinal displacement through a predetermined distance sufficient to effect disengagement with said engine, a disconnecting member having a protruding lug on the outer surface thereof screw-threaded on an end of said quill shaft and arranged for rotation therewith, a plate member detachably affixed to said disconnecting member and said torque rod so that upon the blocking of said disconnecting member against rotation with said shaft, said disconnecting member is caused to be threaded off said shaft carrying with it said torque rod through said predetermined distance, an air blast cap mounted on the end of said auxiliary unit and having a solenoid control device positioned on the outer surface thereof, a plunger connected with said control device and selectively arranged for engagement with said lug on said disconnecting member for blocking said disconnecting member against rotation.

5. A disconnect device for disconnecting an engine from a driven dynamoelectric machine comprising a hollow shaft arranged for driving a rotor of said machine, a flexible shaft concentrically positioned within said hollow shaft splined at one end to said hollow shaft and splined at its other end to said engine, the splines being arranged in a manner wherein said flexible shaft is capable of longitudinal movement through a predetermined distance to effect removal thereof from said engine, a disconnecting nut screw-threadedly attached to an outer end of said hollow shaft, a plate attached to said disconnect nut and provided with a centrally positioned opening of keyhole configuration having a portion thereof arranged to engage a groove provided in the splines affixed to said torque rod so that any axial movement of said nut is directly imparted to said torque rod, a solenoid device including a plunger attached to an air blast cap capable of assuming a plurality of positions on said auxiliary unit for providing cooling fluid thereto, whereby upon actuation of said solenoid device, said plunger engages said disconnect nut to effect axial movement thereof on said shaft and simultaneously transmit a force through said plate to said torque rod to cause movement thereof through said distance to obtain disengagement of said rod with said engine and thereby accomplish isolation of said auxiliary unit.

6. In combination, a device for isolating a driven auxiliary unit from an engine comprising, a hollow quill shaft supporting a rotor for said auxiliary unit, a torque rod concentrically positioned within said hollow shaft and having splines on each end thereof respectively engaging said engine and hollow shaft for transmitting torque from said engine to the auxiliary unit, said torque rod being axially slideable in said hollow shaft a distance sufficient to effect disengagement with said engine, means on said shaft to effect said torque rod disengagement with said engine, said means comprising a disconnect member mounted for rotation on said shaft and capable of axial movement thereof, a plate attached to said disconnect member and having a portion arranged to engage said torque rod, a solenoid having a plunger selectively engageable with said disconnect member so that upon actuation of said solenoid, said plunger engages said disconnect member to effect axial movement thereof on said shaft and simultaneously transmit force through said plate to said torque rod to cause movement thereof through said distance so as to obtain disengagement of said rod with said engine and thereby accomplish isolation of said auxiliary unit.

References Cited in the file of this patent

UNITED STATES PATENTS

| | | |
|---|---|---|
| 1,810,317 | Lasker | June 16, 1931 |
| 2,509,813 | Dineen | May 30, 1950 |
| 2,604,788 | Hauber | July 29, 1952 |
| 2,642,970 | Szekely | June 23, 1953 |

FOREIGN PATENTS

| | | |
|---|---|---|
| 11,106 | Norway | Jan. 16, 1902 |